United States Patent
Hale et al.

(10) Patent No.: US 10,449,652 B2
(45) Date of Patent: Oct. 22, 2019

(54) OPHTHALMIC LENS EDGING PROCESS BY CALCULATION

(71) Applicant: Essilor International, Charenton-le-Pont (FR)

(72) Inventors: Mark Hale, Dallas, TX (US); Roy Karr, Dallas, TX (US); Brad Gelb, Dallas, TX (US); Luc Martin, Charenton-le-Pont (FR); Virginie Beccaro, Gex (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/540,984

(22) PCT Filed: Dec. 31, 2014

(86) PCT No.: PCT/IB2014/003143
§ 371 (c)(1),
(2) Date: Jun. 29, 2017

(87) PCT Pub. No.: WO2016/108063
PCT Pub. Date: Jul. 7, 2016

(65) Prior Publication Data
US 2018/0001435 A1 Jan. 4, 2018

(51) Int. Cl.
*B24B 9/14* (2006.01)
*G05B 19/4093* (2006.01)
(Continued)

(52) U.S. Cl.
CPC .............. *B24B 9/148* (2013.01); *G02C 7/027* (2013.01); *G05B 19/4097* (2013.01);
(Continued)

(58) Field of Classification Search
CPC ........... B24B 9/14; B24B 9/148; B24B 49/00; B24B 51/00; G02C 7/027;
(Continued)

(56) References Cited

U.S. PATENT DOCUMENTS 4,949,510 A  8/1990 Kobayashi et al.
5,067,067 A  11/1991 Estelle et al.
(Continued)

FOREIGN PATENT DOCUMENTS

CN  1035074 A  8/1989

OTHER PUBLICATIONS

ISR/WO for International Appln. No. PCT/IB2014/003143; dated Sep. 2, 2015.

*Primary Examiner* — Timothy V Eley
(74) *Attorney, Agent, or Firm* — Oblon, McClelland, Maier & Neustadt, L.L.P.

(57) ABSTRACT

Described are systems and methods for controlling an ophthalmic lens edging machine are disclosed. The ophthalmic lens edging machine uses an edger code to select a macro or speed for a requested lens edging job. A system for creating and using the edger code may include a Lab Management System (LMS), a lens calculation system, and a lens edging machine. An edger code may be generated using lens data received from a lens management system and edging machine information identifying lens edging machines. The edger code comprises a plurality of characters. Each character is associated with a different feature of a requested edging job. The features of the requested edging job may include, for example, one or more of: a material type, a lens thickness, an edge type, a frame type, a lens coating, a lens shape, a lens ratio, a lens treatment, and an edging machine block type.

20 Claims, 5 Drawing Sheets

(51) Int. Cl.
*G05B 19/4097* (2006.01)
*G02C 7/02* (2006.01)

(52) U.S. Cl.
CPC ............. *G05B 19/40937* (2013.01); *G05B 2219/36232* (2013.01); *G05B 2219/45157* (2013.01); *Y02P 90/265* (2015.11)

(58) Field of Classification Search
CPC .......... G05B 19/40937; G05B 19/4097; G05B 2219/36232; G05B 2219/45157
See application file for complete search history.

(56) References Cited

U.S. PATENT DOCUMENTS

| | | | | |
|---|---|---|---|---|
| 5,454,194 | A * | 10/1995 | Gottschald | B24B 9/148 451/10 |
| 5,485,399 | A * | 1/1996 | Saigo | B24B 9/148 345/420 |
| 6,478,657 | B1 * | 11/2002 | Shibata | B24B 9/148 451/255 |
| 6,623,339 | B1 * | 9/2003 | Igarashi | B23C 3/12 451/42 |
| 7,322,082 | B2 * | 1/2008 | Natsume | B23C 3/12 29/260 |
| 7,448,938 | B2 * | 11/2008 | Inoguchi | B24B 9/148 451/43 |
| 9,205,526 | B2 * | 12/2015 | Samukawa | G05B 19/19 |
| 9,610,667 | B2 * | 4/2017 | Samukawa | B23Q 17/2457 |
| 9,625,743 | B2 * | 4/2017 | Levraud | B24B 9/148 |
| 2008/0058983 | A1 | 3/2008 | Schaeffer | |

* cited by examiner

OPHTHALMIC LENS EDGING PROCESS BY CALCULATION

TECHNICAL FIELD

Embodiments disclosed herein are directed, in general, to systems and methods for edging ophthalmic lenses to conform the lenses to the required dimensions and shape of a spectacles frame in which they are intended to be used.

BACKGROUND

Ophthalmic lenses for eyeglasses may be manufactured from many different materials, such as glass, plastic, polycarbonate, and thermoplastic resins. An ophthalmic lens undergoes a series of molding and/or surfacing/buffing operations that determine the geometry of both the convex and concave optical surfaces of the lens. The surfacing may be followed by appropriate surface treatments, such as multicoat, hardcoat or coloring. The final step in ophthalmic lens manufacture is edging, which consists of machining the lens edge or periphery to conform the lens' dimension and shape to the dimension and shape of the frame in which the lens is to be mounted.

The edging step is typically carried out on a grinding machine comprising an abrasive wheel, such as a diamond abrasive wheel, that is used to remove lens material. Before the edging step, a mounting element is fixed on the center of the convex surface of the ophthalmic lens to form an assembly that can be mounted in the edger. During the edging step, the lens is held by two clamping elements of the grinding machine. The relative movement of the ophthalmic lens and the abrasive wheel is controlled, generally digitally, so as to obtain the required size and shape for the ophthalmic lens.

BRIEF SUMMARY

An ophthalmic lens edging machine uses an edger code to select a macro or speed for a requested lens edging job. A system for creating and using the edger code may include a Lab Management System (LMS), a lens calculation system, and a lens edging machine. An edger code may be generated using lens data received from a lens management system and edging machine information identifying one or target lens edging machines. The edger code comprises a plurality of characters. Each character is associated with a different feature of a requested edging job. The features of the requested edging job may include, for example, one or more of: a material type, a lens thickness, an edge type, a frame type, a lens coating, a lens shape, a lens ratio, a lens treatment, and an edging machine block type.

A determination is made regarding whether a particular feature is activated for edger code generation. If the particular feature is activated, then a character is identified for that feature. The characters may include digits, alphanumeric characters, special characters, symbols, or any other character. The characters may be represented in a decimal, hexadecimal, octal, binary format or any other appropriate format for the system generating and/or using the edger code. If the particular feature is not activated, then a zero or null value is assigned to that feature.

The edger code generation process sequentially identifies characters for each of a plurality of features associated with the requested edging job. When no more features need to be evaluated, a character string is created by concatenating the characters for each of the plurality of features. The character string is assigned as the edger code value. The edger code may be transmitted to a selected lens edging machine. The edger machine may then provide feedback. The feedback comprises information regarding the selected lens edging machine's capabilities relative to the requested edging job. The feedback may comprise information regarding the lens edging machine's capability to execute the requested edging job associated with the edger code. The source device may cause a new edger code to be generated based upon the feedback.

An edger code may be received at a lens edging machine. The edging machine determines a total weight for the edger code based upon weights assigned to each individual character. An edging process macro is then selected based upon the total weight of the edger code.

In one embodiment, the total weight of the edger code may be determined by identifying a value of each individual character in the edger code. A weight is then identified for each value. The weights for each value are then combined to generate the total weight. The process may determine that one or more unweighted characters in the edger code are not assigned a weight. The unweighted characters may be ignored when determining the total weight.

BRIEF DESCRIPTION OF THE DRAWINGS

Reference will now be made to the accompanying drawings.

Figure 1:
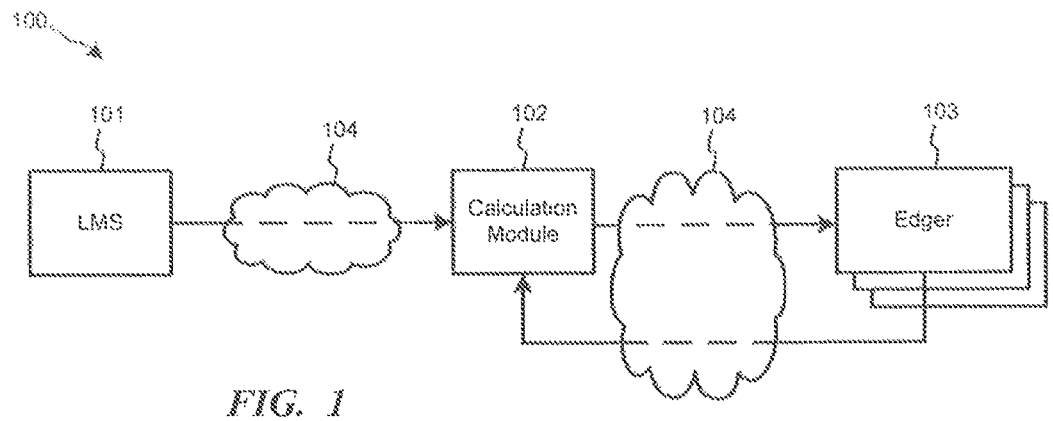
FIG. 1 is a highly simplified block diagram of a system for controlling edging of ophthalmic lenses.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Edger machines with diamond abrasive lens-edging wheels are traditionally used in ophthalmic lens edging operations. The edger machine receives input parameters from a host system, such as an LMS. Typically, the edger uses only a few parameters, such as an indication of the lens material used and the lens dimensions required for a selected frame, to determine how to cut the lens. Traditionally, edging machines use lens material information to select a macro that provides the cutting speed that is used to cut the lens down to a desired shape. The edger spins the diamond abrasive wheel at a constant rotational speed selected by the macro. Typical edging machines also rotate the lens at a constant speed.

The diamond abrasive wheel is moved in and out relative to the lens to remove lens material until the desired shape is achieved. In a typical automated edging operation, the first step is roughing wherein the lens is cut down to the approximate dimensions of the desired final shape. The edger then bevels/grooves the lens to form the appropriate edge for the selected frame. The lens edge is then polished by the edger when it has been cut to the desired shape. Depending upon the selected frame, the edger may run additional processes, such as cutting shelves, chamfering, or drilling, as needed to fit the selected frame. Traditional edging machines do not have the capability to adjust their speed or otherwise optimize their operation based upon lens data other than material type.

Embodiments of the invention provide a flexible edger that calculates the edging process based upon parameters, such as:

lens radius of curvature or lens curve (including aspheric impact);
lens thickness throughout processing, (i.e., not limited to thickness at the beginning and final thickness and including edge thickness induced by decentration);
added value treatments (e.g., lenses with Hard Multi Coating (HMC), polarizing film, photochromic or other photochromic layer);
laminate and patch transfer treatments;
lens diameter; and
lens material.

In some embodiments, each of these parameters may be separately weighted as more or less important to the selection of the appropriate macro or speed for the edger.

FIG. 1 is a highly simplified block diagram of a system 100 for controlling edging of ophthalmic lenses. LMS 101 provides lens data to be used by edger 103. In traditional edging machines, the lens material type is used to determine what speed should be used by the edger 103 to cut the lens. Embodiments disclosed herein use calculation module 102 to provide more detailed lens information to edger 103 so that specialized cutting programs may be used. For example, specialized cutting programs may vary the rotation speed of the diamond abrasive lens-edging wheel and/or the positioning of the lens to optimize cutting while minimizing potential damage to the lens and/or any treatments or coatings applied to the lens. In one embodiment, the detailed lens information may be formatted as a multi-character code that is sent from calculation module 102 to edging machine 103.

LMS 101 may be a specialized lens manufacturing software application running on a host machine, such as a computer terminal. Calculation module 102 may be a component of LMS 101 or may be a separate application on the host machine. In other embodiments, calculation module 102 may be part of a separate system, such as an ophthalmic lens calculation system, that receives data from a remote LMS 101. The LMS 101, calculation module 102, and edger 103 components may be in one location or at locations remote from each other and may communicate directly or indirectly over a network 104, such as a Local Area Network (LAN), Wide Area Network (WAN), an intranet, or the Internet.

Edger 103 may provide feedback to the calculation module 102 to further optimize operation of the system 100. For example, edger 103 may notify calculation module 102 regarding the availability of consumables, a wear level for the diamond abrasive wheel, or the status of other components.

In other embodiments, system 100 may include multiple edging machines 103 and the instructions provided by calculation module 102 may be modified based upon the edger 103 that is selected, available, or scheduled to receive a particular edging job. Calculation module 102 may also select or recommend a particular edger 103 to be used for a particular edging job based upon edger capabilities and the calculated edging data.

Figure 2:
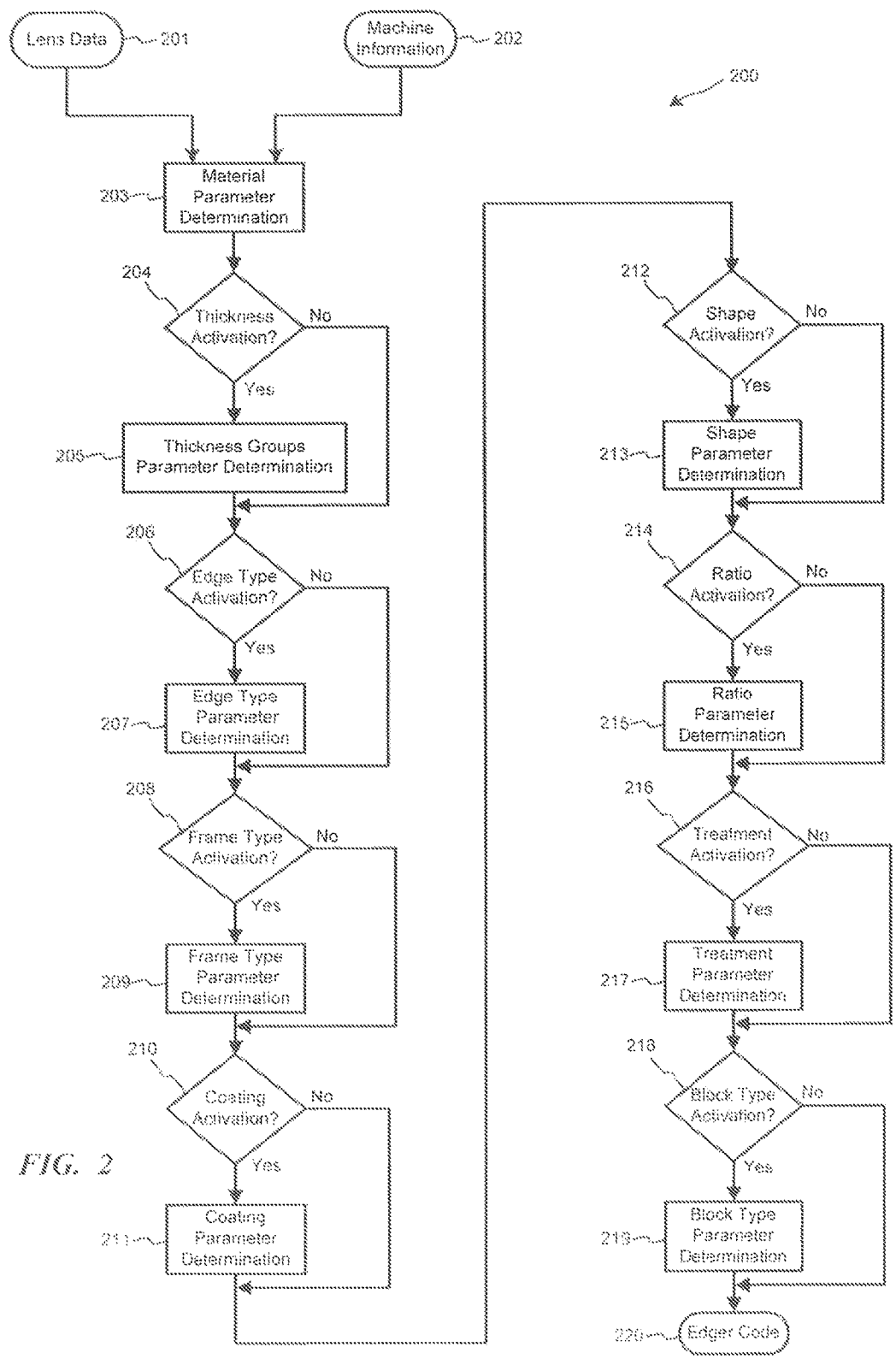
FIG. 2 is a flowchart illustrating an example process for calculating lens edging data according to one embodiment.

FIG. 2 is a flowchart illustrating an example process 200 for calculating lens edging data according to one embodiment. When used with an example system 100 (FIG. 1), process 200 may be a software algorithm that is executed by calculation module 102, for example. Process 200 begins by receiving lens data 201 and edging machine information 202. Lens data 201 may be received from an LMS or other source. Lens data may comprise, for example, all information about a particular lens blank that is to be edged, such as lens material type and thickness, lens treatments applied, selected frame style, eyeglasses prescription information, etc. Edging machine information 202 may comprise any relevant information about one or more edging machines that are available to process lens orders. The edging machine information may include, for example, edger model/serial number, diamond abrasive wheel status, drill status, consumable status, scheduled jobs, etc.

Based upon the lens data 201 and edging machine information 202, the process 200 calculates lens edging data. As noted above, in one embodiment, the lens edging data may be formatted as a multi-character code that is sent to the selected edging machine. For example, the multi-character code may be a string of digits, wherein each digit position corresponds to a particular lens, frame, or machine parameter, and the value of each digit represents a characteristic of that parameter. Accordingly, in the embodiment illustrated in process 200, each step 203-219 provides a digit that is used to generate an edger code 220 output. The process may determine whether to evaluate and activate each of the parameters individually based upon, for example, the selected lens, frame, and/or machine.

In step 203, the process determines a material parameter using the provided lens data. Step 203 outputs a first digit that corresponds to the material type of the lens to be edged. In one embodiment, the first digit may be selected based upon the list illustrated in Table 1. Specific material type examples are shown in Table 1. However, it will be understood that any number and/or type of materials may be listed in other embodiments.

TABLE 1

| Material | First Digit |
| --- | --- |
| Plastic | 1 |
| Polycarbonate | 2 |
| Glass | 3 |
| Hi-Index | 5 |
| Trivex | 6 |

In step 204, the process determines whether to evaluate lens thickness while calculating the edger code. If lens thickness is activated, the process moves to step 205, which outputs a second digit that corresponds to the thickness group of the lens. Otherwise, if lens thickness is not considered, then the second digit may be assigned a zero or null value, and the process moves to step 206. The thickness of the lens depends upon the lens blank size, refractive index, and lens power. The lens thickness may vary from the center to the edge of the lens. The maximum thickness that the edger will need to edge depends upon the above-mentioned lens blank parameters and the shape of the selected frame (i.e., the required shape of the lens to fit the frame). Step 204 may determine a thickness group parameter based upon where the maximum thickness edged (MTE) falls within preselected ranges.

In one embodiment, the second digit may be selected based upon the list illustrated in Table 2. Three example thickness ranges are illustrated in Table. However, it will be understood that any number of thickness ranges may be used in other embodiments.

TABLE 2

| Max Thickness Edged (MTE) | Second Digit |
| --- | --- |
| 0 < MTE ≤ x | 1 |
| x < MTE ≤ y | 2 |
| y < MTE | 3 |

Process 200 begins generating the edger code by appending the second digit to the first digit to form a string of digits. The process moves to step 206.

In step 206, the process determines whether to evaluate the edge type while calculating the edger code. If edge type is activated, then the process moves to step 207, which outputs a third digit that corresponds to the edge type of the lens. Otherwise, if edge type is not considered, the third digit may be assigned a zero or null value, and the process moves to step 208. The edge type may depend, for example, on whether the edge is exposed by or bonded to the selected frame. In one embodiment, the second digit may be selected based upon the list illustrated in Table 3. Three edge types are illustrated in Table 3. However, it will be understood that any number of edge types may be used in other embodiments.

TABLE 3

| Edge Type | Third Digit |
| --- | --- |
| Polish | 0 |
| Non-Polish | 1 |
| High Luster | 2 |

After appending the third digit to the digit string in the edger code, the process moves to step 208, wherein the process determines whether to evaluate the frame type while calculating the edger code. If frame type is activated, then the process moves to step 209, which outputs a fourth digit that corresponds to the frame type of the lens. Otherwise, if frame type is not considered, the fourth digit may be assigned a zero or null value, and the process moves to step 210.

In one embodiment, the fourth digit may be selected based upon the list illustrated in Table 4. It will be understood that any number of frame types may be used to select the frame type digit.

TABLE 4

| Frame Type | Fourth Digit |
| --- | --- |
| Flat | 1 |
| Plastic Full Rim | 2 |

TABLE 4-continued

| Frame Type | Fourth Digit |
| --- | --- |
| Metal Full Rim | 2 |
| Drilling | 1 |
| Optyl Full Rim | 2 |
| Metal Wire | 1 |
| Nylor | 1 |

After appending the fourth digit to the digit string in the edger code, the process moves to step 210, wherein the process determines whether to evaluate the lens coating while calculating the edger code. If lens coating is activated, then the process moves to step 211, which outputs a fifth digit that corresponds to the lens coating. Otherwise, if coating is not considered, the fifth digit may be assigned a zero or null value, and the process moves to step 212.

In one embodiment, the fifth digit may be selected based upon the list illustrated in Table 5. Specific coating examples are shown in Table 5. However, it will be understood that any number and/or type of coatings or combinations of coatings may be listed in other embodiments.

TABLE 5

| Coating | Fifth Digit |
| --- | --- |
| Clear | 1 |
| Anti-reflective | 2 |
| Scratch resistance | 3 |
| Anti-static | 4 |
| Smudge resistance | 5 |
| Water repellence | 6 |

After appending the fifth digit to the digit string in the edger code, the process moves to step 212, wherein the process determines whether to evaluate the desired lens shape while calculating the edger code. If lens shape is activated, then the process moves to step 213, which outputs a sixth digit that corresponds to the general lens shape required to fit the selected frame. Otherwise, if lens shape is not considered, the sixth digit may be assigned a zero or null value, and the process moves to step 214.

In one embodiment, the sixth digit may be selected based upon the list illustrated in Table 6. Specific lens shapes are shown in Table 6. However, it will be understood that any number and/or type of coatings may be listed in other embodiments.

TABLE 6

| Lens Shape | Sixth Digit |
| --- | --- |
| Square | 1 |
| Rectangle | 2 |
| Round-square | 3 |
| Round-rectangle | 4 |
| Circle | 5 |
| Ellipse | 6 |
| Ellipto-rectangle | 7 |

After appending the sixth digit to the digit string in the edger code, the process moves to step 214, wherein the process determines whether to evaluate the lens ratio while calculating the edger code. If lens ratio is activated, then the process moves to step 215, which outputs a seventh digit that corresponds to the lens ratio (i.e., the ratio of the lens width (A) to lens height (B) when cut to fit the selected frame).

Otherwise, if lens ratio is not considered, the seventh digit may be assigned a zero or null value, and the process moves to step 216.

In one embodiment, the seventh digit may be selected based upon the list illustrated in Table 7. Specific lens ratio ranges are shown in Table 7. However, it will be understood that any number and/or type of ratios may be listed in other embodiments.

TABLE 7

| Lens Ratio (A/B) | Seventh Digit |
|---|---|
| $0 < A/B \leq x$ | 1 |
| $x < A/B \leq y$ | 2 |
| $y < A/B$ | 3 |

After appending the seventh digit to the digit string in the edger code, the process moves to step 216, wherein the process determines whether to evaluate the lens treatment while calculating the edger code. If lens treatment is activated, then the process moves to step 217, which outputs an eighth digit that corresponds to the treatment that may have been applied to the lens. Otherwise, if lens treatment is not considered, the eighth digit may be assigned a zero or null value, and the process moves to step 218.

In one embodiment, the eighth digit may be selected based upon the list illustrated in Table 8. Specific examples of lens treatments are shown in Table 8. However, it will be understood that any number and/or type of treatments or combinations of treatments may be listed in other embodiments.

TABLE 8

| Lens Treatment | Eighth Digit |
|---|---|
| Photochromic | 1 |
| Lamination | 2 |
| Patch | 3 |
| Aspheric | 4 |

After appending the eighth digit to the digit string in the edger code, the process moves to step 218, wherein the process determines whether to evaluate the block type while calculating the edger code. If block type is activated, then the process moves to step 219, which outputs a ninth digit that corresponds to the block type that is used to hold the lens in the edging machine. Otherwise, if block type is not considered, the ninth digit may be assigned a zero or null value, and the process moves to step 220 where the final edger code is output.

In one embodiment, the ninth digit may be selected based upon the list illustrated in Table 9. Specific examples of block types are shown in Table 9. However, it will be understood that any number and/or type of block types may be listed in other embodiments.

TABLE 9

| Block Type | Ninth Digit |
|---|---|
| Loh | 1 |
| Nidek | 2 |
| Briot | 3 |
| Takubo | 4 |

After appending the ninth digit to the digit string in the edger code, the process moves to step 220 where the final edger code is output. The edger code may then be forwarded from the calculation module to the edger.

Edging machines typically provide a number of macro settings that may be selected to instruct the machine how to cut a particular lens. Different macros cause the edger's diamond abrasive wheel to operate at different speeds. The data in the edger code may be used to select the macro to be used for a particular lens. In one embodiment, the various values for each parameter represented by the digits in the edger code are given a weight. The weight of all the parameters may be combined (e.g., by adding, calculating an arithmetic or geometric mean, identifying a median or mode value, etc.). The combined weight may then be used to select the macro/speed to be used for a particular lens.

Tables 10 and 11 illustrate how macros may be assigned in different machines. Table 10 illustrates an edger model that provides three macros per material. Table 11 illustrates an edger model that provides five macros per material. Each macro corresponds to an assigned edger speed (i.e., diamond abrasive wheel rotation speed) and a lens parameter weight group. The edger code may be converted to a total weight. The macro corresponding to the weight group that the total weight falls within is then used to process the lens.

TABLE 10

| Macro Number | Speed | Weight Group |
|---|---|---|
| 1 | Slow | $\infty \leq \text{weight} \leq x_1$ |
| 2 | Normal | $x_1 < \text{weight} < x_2$ |
| 3 | Fast | $x_2 \leq \text{weight} \leq -\infty$ |

In the three-macro system represented by Table 10, macro number 2 is selected for normal operations. Macro number 1 causes the edger to operate a slower speed when the weighted edger code falls within a relatively high value. Macro number 3 causes the edger to operate a faster speed when the weighted edger code falls within a relatively low value.

TABLE 11

| Macro Number | Speed | Weight Group |
|---|---|---|
| 1 | Very Slow | $\infty \leq \text{weight} \leq x_1$ |
| 2 | Slow | $x_1 < \text{weight} < x_2$ |
| 3 | Normal | $x_2 < \text{weight} < x_3$ |
| 4 | Fast | $x_3 < \text{weight} < x_4$ |
| 5 | Very Fast | $x_4 \leq \text{weight} \leq -\infty$ |

In a five-macro system represented by Table 11, macro number 3 is selected for normal operations. Macro number 2 causes the edger to operate a slower speed when the weighted edger code falls within a higher than normal value. Macro number 1 causes the edger to operate a very slow speed when the weighted edger code falls within a very high value. Macro number 4 causes the edger to operate a faster speed when the weighted edger code within a lower than normal value. Macro number 5 causes the edger to operate a very fast speed when the weighted edger code falls within a very low value.

In general, for higher value weighted edger codes, a slower macro is selected.

Conversely, as the weighted edger code value decreases, a faster macro is selected.

The individual parameters within the edger code (i.e., the parameters represented by the individual digits) may be assigned weights such as: very low (−−), low (−), medium (0), high (+), or very high (+).

For example, different values of the thicknesses parameter (i.e., second digit) may be weighted as illustrated in Table 12.

TABLE 12

| Thickness | Weight |
| --- | --- |
| Thin | Low (−) |
| Normal | Medium (0) |
| Thick | High (+) |

The values of the edge type parameter (i.e., third digit) may be weighted, for example, as illustrated in Table 13.

TABLE 13

| Edge Type | Weight |
| --- | --- |
| Polish | High (+) |
| Non-polish | Medium (0) |
| High luster | Very High (++) |

The values of the coating parameter (i.e., fifth digit) may be weighted, for example, as illustrated in Table 14.

TABLE 14

| Coating | Weight |
| --- | --- |
| Clear | Low (−) |
| Anti-reflective | High (+) |
| Scratch resistance | High (+) |
| Anti-static | High (+) |
| Smudge resistance | High (+) |
| Water repellence | High (+) |

The values of the lens shape parameter (i.e., sixth digit) may be weighted, for example, as illustrated in Table 15.

TABLE 15

| Lens Shape | Weight |
| --- | --- |
| Square | Very High (++) |
| Rectangle | Very High (++) |
| Round-square | High (+) |
| Round-rectangle | High (+) |
| Circle | Very Low (−1) |
| Ellipse | Low (−) |
| Ellipto-rectangle | Medium (0) |

The values of the lens ratio parameter (i.e., seventh digit) may be weighted, for example, as illustrated in Table 16.

TABLE 16

| Lens Ratio (A/B) | Weight |
| --- | --- |
| $0 < A/B \leq x$ | Low (−) |
| $x < A/B \leq y$ | Medium (0) |
| $y < A/B$ | High (+) |

The values of the treatment parameter (i.e., eighth digit) may be weighted, for example, as illustrated in Table 17.

TABLE 17

| Lens Treatment | Weight |
| --- | --- |
| Photochromic | Low (−) |
| Lamination | High (+) |

TABLE 17-continued

| Lens Treatment | Weight |
| --- | --- |
| Patch | High (+) |
| Aspheric | Very High (++) |

In some embodiments, only some of the edger code parameters are relevant to the speed used in the edging machine. As a result, those parameters might not be assigned a weighting. For example, the frame type (i.e., fourth digit) or block type (i.e., ninth digit) parameters are unlikely to impact the operation of the edger and, therefore, those parameters are not included in the weighting process. Other parameters that are directly used to select to the edger macro, such as the lens material (i.e., first digit), are also not assigned a weighting. It will be understood that the weights assigned in example tables 12-17 are for illustration only and that other weights may be assigned in other embodiments and that other combinations of weighted and unweighted parameters may be used. Additionally, other embodiments may use other weighting ranges (i.e., other than a three-level or five-level weighting scheme).

An example lens order may be used to illustrate how the edger code is generated and how the edger code weighting is used to select the macro used by the edging machine. For instance, an average-thickness polycarbonate lens having a lamination treatment and no coating may be edged using an ES4 edging machine from Satisloh AG to fit a rimless frame that requires a wide, rectangle-shaped lens with a high luster on any exposed edges.

This example lens order corresponds to the parameters illustrated in Table 18.

TABLE 18

| Edger Code Digit Position | Parameter Value | Digit Value | Weight |
| --- | --- | --- | --- |
| First | Polycarbonate material | 2 | |
| Second | Normal thickness | 2 | 0 |
| Third | High luster edge | 2 | ++ |
| Fourth | Rimless frame requiring drilling | 1 | |
| Fifth | No coating | 1 | − |
| Sixth | Rectangle lens shape | 2 | ++ |
| Seventh | Wide lens ratio | 3 | + |
| Eighth | Lamination treatment | 2 | + |
| Ninth | Statisloh edger | 1 | |

Using the example lens data, the calculation module will generate an edger code of 222116311 as indicated by the digit value column of Table 18. This code may be sent to the edging machine assigned to process the lens. In this example, the edging machine is a Statisloh ES4 machine. Upon receipt of the edger code, the edging machine calculates the total weighting associated with the edger code. As indicated in the weight column of Table 18, the combined weighting values result in a five-plus (+++++) weighting. The edging machine then refers to the appropriate macro chart (e.g., Table 10 or 11) for the selected lens material and chooses the appropriate macro based upon the total weighting. The edger then executes the edging process using the assigned speed.

Although the example used herein creates a nine-digit edger code, it will be understood that in other embodiments any other code length may be used. Additionally, the ender code is not limited to using digits, but may also use any alphanumeric or special character or symbol, such as any ASCII character represented in a decimal, hexadecimal, octal, or binary form.

Figure 3:
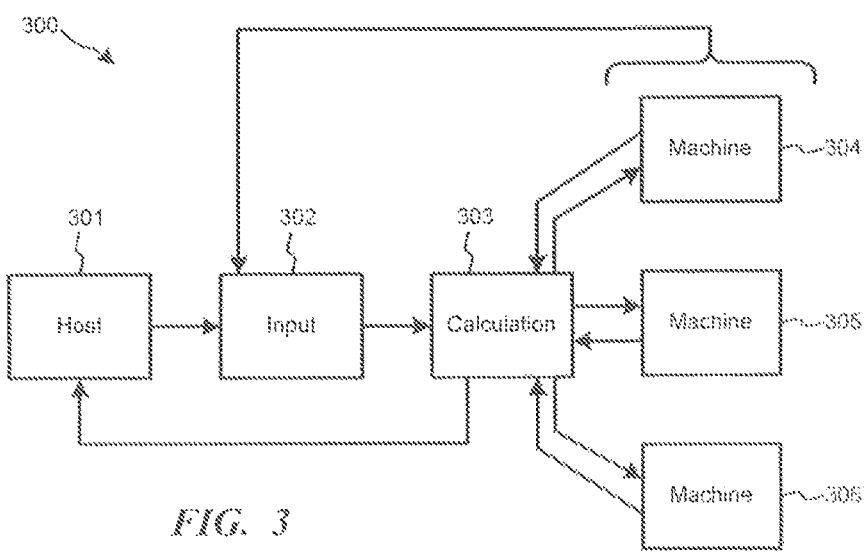
FIG. 3 is a flowchart illustrating a dynamic macro-selection system according to one embodiment.

FIG. 3 is a flowchart illustrating a dynamic macro-selection system 300 according to one embodiment. Host 301, which may be an LMS in one embodiment, sends lens data to input block 302. In one embodiment, input block 302 is a component of a lens calculation system. Input block 302 receives additional information, such as a list of available edging machines 304-306. Inputs block 302 provides the lens data and edger information to calculation block 303, which processes the inputs to calculate an edger code for one or more of the edging machines 304-306. The information shared among host 301, input block 302, and calculation block 303 may be described using a text-based markup language, such as Extensible Markup Language (XML). It will be understood that other communication formats may also be used.

The calculation block 303 may determine whether it is feasible for the available edging machines to process the lens using the lens data provided by host 301. If the requested lens edging is not feasible, calculation block may provide relevant feedback to host 301. The calculation block 303 may request revised lens data from host 301 and/or may provide information regarding lens edging options available using machines 304-306. In response, host 301 may provide updated lens data to input block 302, which requests an updated edger code from calculation block 303.

Calculation block 303 may provide the edger code to a selected one of the edging machines 304-306, which in turn uses the edger code to determine the appropriate macro for the requested processing. The selected edging machine may provide feedback to calculation block 303, such as machine condition or capability. Upon receipt of feedback from machines 304-306, calculation block 303 may generate a new edger code and/or may pass the edging machine's feedback to host 301.

Using the feedback from edging machines 304-306, calculation block 303 may make several passes at generating an edger code for a particular lens order until an optimized and/or feasible edger code is created.

In one embodiment, the format used for communications between calculation block 303 and edging machines 304-306 complies with the formats defined in the Data Communication Standard (DCS) as set forth by The Vision Council. It will be appreciated by those of skill in the art that other instruction formats may also be used. DCS provides the capability to use a record labeled "LMATTYPE" to identify the basic material type of a lens using an integer value. Traditional edging machines select the macro used for edging a lens based upon the value of the LMATTYPE record.

DCS also provides a record labeled "LMATID" that is used to exchange an integer material number that is agreed upon by a device and its host to access common material setup tables. The LMATID record is included, for example, in the Preset Lens Edger ("EDG") packet as defined by DCS. In one embodiment, an edger code as described above may be communicated from the calculation module to the edging machine as the integer value of the LMATID record. Upon receiving a non-zero value for the LMATID record, an edger may ignore the material type record LMATTYPE and instead use the edger code in the LMATID record to select the appropriate macro process for the lens.

Figure 4:
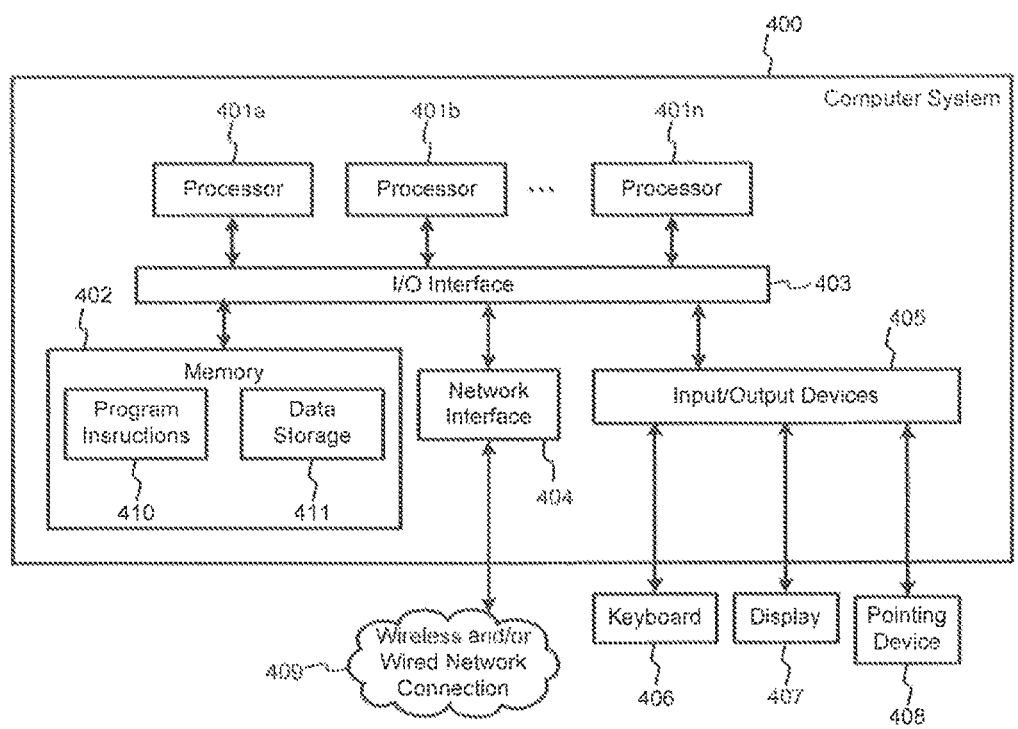
FIG. 4 illustrates an example computer system for generating a weighted edger code.

Embodiments of the present systems and methods for generating a weighted edger code, as described herein, may be implemented or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, computer 400 may implement one or more steps of example process 200 described above with respect to FIG. 2, and/or computer system 400 may be used as, or as part of, one or more of an LMS 101, calculation module 102, or edger 103 (FIG. 1) or host 301, input block 302, calculation block 303, or machine 304-306 (FIG. 3).

As illustrated, example computer system 400 includes one or more processors 401 coupled to a system memory 402 via an input/output (I/O) interface 403. Example computer system 400 further includes a network interface 404 coupled to I/O interface 403, and one or more input/output devices 405, such as keyboard 406, display 407, or pointing device 408, such as a cursor control device, mouse or touchpad. Multiple input/output devices 405 may be present in computer system 400 or may be distributed on various nodes of computer system 400. In some embodiments, similar input/output devices may be separate from computer system 400 and may interact with one or more nodes of computer system 400 through a wired or wireless connection 409, such as over network interface 404.

In various embodiments, computer system 400 may be a single-processor system including one processor 401, or a multi-processor system including two or more processors 401 (e.g., two, four, eight, or another suitable number). Processors 401 may be any processor capable of executing program instructions. For example, in various embodiments, processors 401 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 401 may commonly, but not necessarily, implement the same ISA. Also, in some embodiments, at least one processor 401 may be a graphics processing unit (GPU) or other dedicated graphics-rendering device.

System memory 402 may be configured to store program instructions and/or data accessible by processor 401. In various embodiments, system memory 402 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 3, may be stored within system memory 402 as program instructions 410 and data storage 411, respectively. In other embodiments, program instructions and/or data may be received, sent or stored upon different types of computer-accessible media or on similar media separate from system memory 402 or computer system 400. Generally speaking, a computer-readable medium may include any tangible or non-transitory storage media or memory media such as magnetic or optical media—e.g., disk or CD/DVD-ROM coupled to computer system 400 via I/O interface 403, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 404.

In some embodiments, I/O interface 403 may be configured to coordinate I/O traffic between processor 401, system memory 402, and any peripheral devices in the device, including network interface 404 or other peripheral interfaces, such as input/output devices 405. In some embodiments, I/O interface 403 may perform any suitable protocol, timing or other data transformations to convert data signals from one component (e.g., system memory 402) into a format usable by another component (e.g., processor 401). In some embodiments, I/O interface 403 may include support for devices attached through various types of peripheral buses, such as a variant of the Peripheral Component Interconnect (PCI) bus standard or the Universal Serial Bus (USB) standard, for example. In some embodiments, the function of I/O interface 403 may be split into two or more separate components, such as a north bridge and a south bridge, for example. In addition, in some embodiments, some or all of the functionality of I/O interface 403, such as an interface to system memory 402, may be incorporated into processor 401.

Network interface 404 may be configured to allow data to be exchanged between computer system 400 and other devices attached to a network, such as other computer systems, or between nodes of computer system 400. In various embodiments, network interface 404 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 4, memory 402 may include program instructions 410, configured to implement certain embodiments described herein, and data storage 411, comprising various data accessible by program instructions 410. In an embodiment, program instructions 410 may include software elements corresponding to one or more of the various embodiments illustrated in the above figures. For example, program instructions 410 may be implemented in various embodiments using any desired programming language, scripting language, or combination of programming languages and/or scripting languages (e.g., C, C++, C#, JAVA®, JAVASCRIPT®, ANGULAR JS®, PERL®, etc.). Data storage 411 may include data that may be used in these embodiments. In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Figure 5:
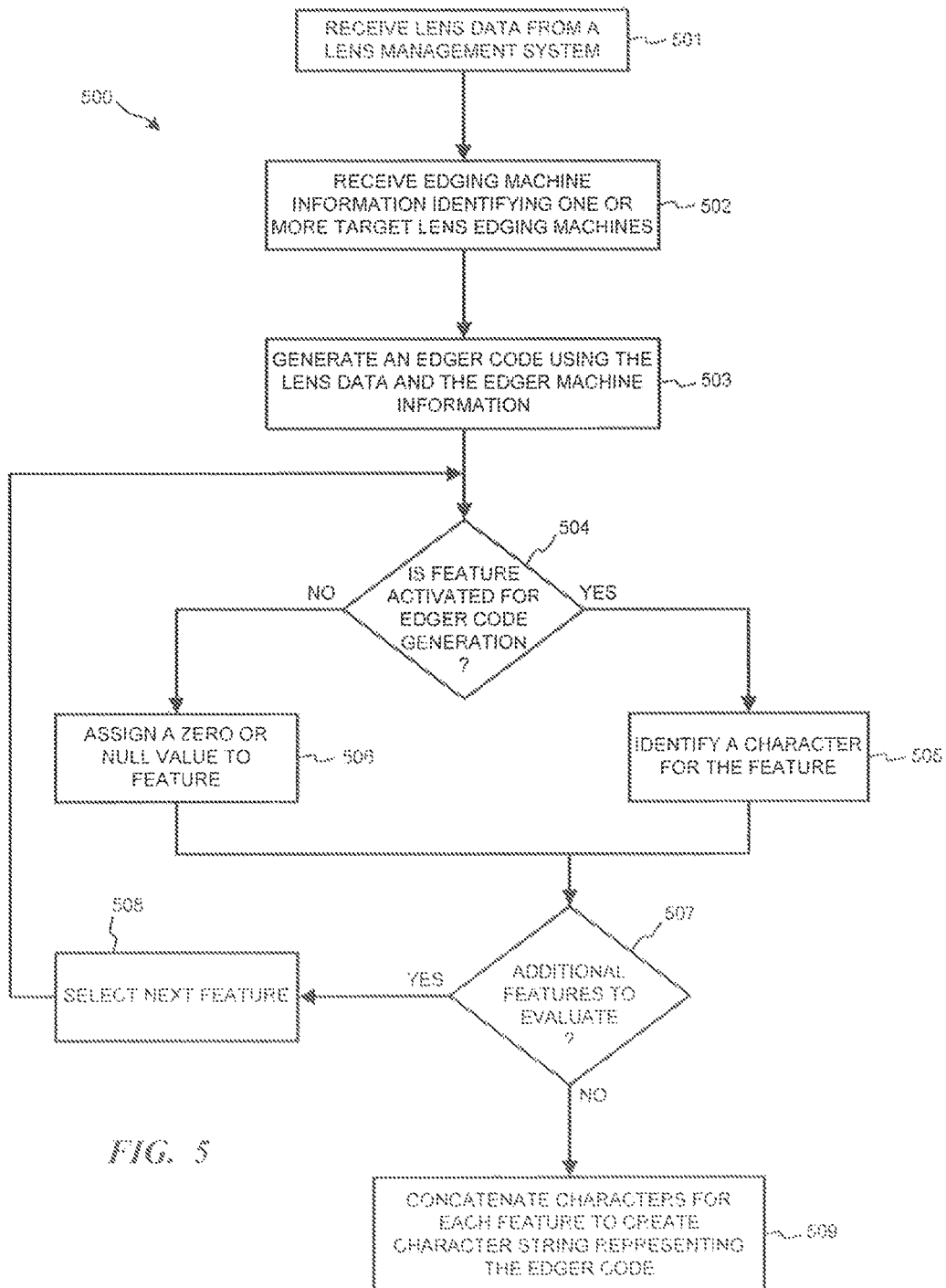
FIG. 5 is a flowchart illustrating a process for generating an edger code according to one embodiment.

FIG. 5 is a flowchart illustrating a process 500 for generating an edger code according to one embodiment. In step 501, lens data is received from a lens management system. In step 502, edging machine information identifying one or target lens edging machines is received. In step 503, an edger code is generated using the lens data and the edger machine information, the edger code comprising a plurality of characters. Each character is associated with a different feature of a requested edging job. The features of the requested edging job may include, for example, one or more of: a material type, a lens thickness, an edge type, a frame type, a lens coating, a lens shape, a lens ratio, a lens treatment, and an edging machine block type.

In step 504, a determination is made regarding whether a particular feature is activated for edger code generation. In step 505, if the particular feature is activated, then a character is identified for that feature. The characters may include digits, alphanumeric characters, special characters, symbols, or any other character. The characters may be represented in a decimal, hexadecimal, octal, binary format or any other appropriate format for the system generating and/or using the edger code. In step 506, if the particular feature is not activated, then a zero or null value is assigned to that feature.

In step 507, the process determines whether there are additional features to evaluate. If so, then the process moves to step 508 and the next feature is selected. The process returns to step 504 sequentially identifying characters for each of a plurality of features associated with the requested edging job. If no more features need to be evaluated in step 507, then in step 509, a character string is created by concatenating the characters for each of the plurality of features. The character string is assigned as the edger code value.

The edger code may be transmitted to a selected lens edging machine. The edger machine may then provide feedback. The feedback comprises information regarding the selected lens edging machine's capabilities relative to the requested edging job.

Figure 6:
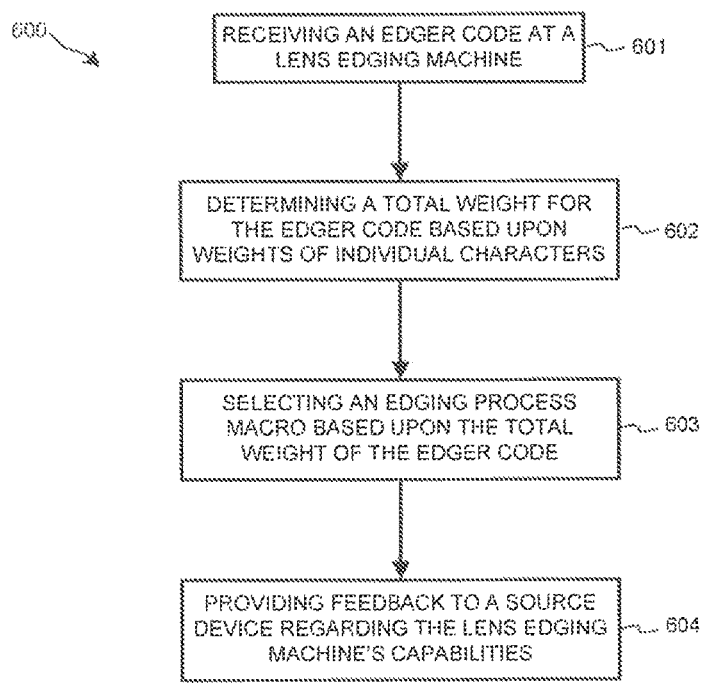
FIG. 6 is a flowchart illustrating a process for using an edger code according to one embodiment.

FIG. 6 is a flowchart illustrating a process 600 for using an edger code according to one embodiment. In step 601, an edger code is received at a lens edging machine. The edger code may represent data associated with a requested edging job and may comprise a plurality of characters. Each character is associated with a different feature of the requested edging job. In step 602, a total weight for the edger code is determined based upon weights assigned to each individual character. In step 603, an edging process macro is selected based upon the total weight of the edger code.

In one embodiment, the total weight of the edger code may be determined by identifying a value of each individual character in the edger code. A weight is then identified for each value. The weights for each value are then combined to generate the total weight. The process may determine that one or more unweighted characters in the edger code are not assigned a weight. The unweighted characters may be ignored when determining the total weight.

In step 604, the edging machine provides feedback to a source device that provided the edger code. The feedback may comprise information regarding the lens edging machine's capability to execute the requested edging job associated with the edger code. The source device may cause a new edger code to be generated based upon the feedback.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An ophthalmic lens edging machine, comprising:
   a processor; and
   a memory coupled to the processor, the memory having program instructions stored thereon that, upon execution by the processor, cause the ophthalmic lens edging machine to:
   receive an edger code comprising data associated with a requested edging job, the edger code comprising a plurality of characters, wherein each character of the plurality of characters is associated with a different feature of the requested edging job;
   determine a total weight for the edger code based upon weights of each character of the plurality of characters; and
   select an edging process macro based upon the total weight of the edger code.

2. The ophthalmic lens edging machine of claim 1, wherein the plurality of characters in the edger code comprise characters selected from a group consisting of: digits, alphanumeric characters, special characters, and symbols.

3. The ophthalmic lens edging machine of claim 1, wherein the plurality of characters in the edger code are represented in at least one of a decimal, hexadecimal, octal, and binary format.

4. The ophthalmic lens edging machine of claim 1, wherein the program instructions further cause the ophthalmic lens edging machine to: identify a value of each individual character in the edger code; identify a weight for each value; and combine the weight for each value to generate the total weight.

5. The ophthalmic lens edging machine of claim 4, wherein the program instructions further cause the ophthalmic lens edging machine to: determine that one or more unweighted characters in the edger code are not assigned a weight; and ignore the one or more unweighted characters when determining the total weight.

6. The ophthalmic lens edging machine of claim 1, wherein the program instructions further cause the ophthalmic lens edging machine to: provide feedback to a source device that provided the edger code, wherein the feedback comprises information regarding an ability of the ophthalmic lens edging machine to execute the requested edging job associated with the edger code.

7. The ophthalmic lens edging machine of claim 6, wherein the feedback comprises one or more of an abrasive wheel wear level, a consumable availability, and a component status.

8. A method, comprising:
   receiving lens data from a lens management system;
   receiving edging machine information identifying one or more lens edging machines; and
   generating an edger code using the lens data and the edging machine information, the edger code comprising a plurality of characters, wherein each character is associated with a different feature of a requested edging job.

9. The method of claim 8, further comprising: determining whether a particular feature is activated for edger code generation; if the particular feature is activated, identifying a character for that feature; and if the particular feature is not activated, assigning a zero or null value for the particular feature.

10. The method of claim 9, further comprising: sequentially identifying characters for each of a plurality of features associated with the requested edging job; creating a character string by concatenating the characters for each of the plurality of features; and assigning the character string as an edger code value.

11. The method of claim 8, further comprising:
    transmitting the edger code to a selected lens edging machine; and
    receiving feedback from the selected lens edging machine, the feedback comprising information regarding capabilities of the selected lens edging machine relative to the requested edging job.

12. The method of claim 8, wherein the plurality of characters in the edger code comprise characters selected from a group consisting of: digits, alphanumeric characters, special characters, and symbols.

13. The method of claim 8, wherein the plurality of characters in the edger code are represented in a decimal, hexadecimal, octal, or binary format.

14. The method of claim 8, wherein features of the requested edging job comprise one or more of: a material type, a lens thickness, an edge type, a frame type, a lens coating, a lens shape, a lens ratio, a lens treatment, and an edging machine block type.

15. A method, comprising:
    receiving an edger code at a lens edging machine, the edger code comprising data associated with a requested edging job, the edger code comprising a plurality of characters, wherein each character is associated with a different feature of the requested edging job;
    determining a total weight for the edger code based upon weights assigned to each individual character of the plurality of characters; and
    selecting an edging process macro based upon the total weight of the edger code.

16. The method of claim 15, further comprising selecting the plurality of characters in the edger code from a group consisting of: digits, alphanumeric characters, special characters, and symbols.

17. The method of claim 15, further comprising representing the plurality of characters in the edger code in at least one of a decimal, hexadecimal, octal, and binary format.

18. The method of claim 15, further comprising: identifying a value of each individual character of the plurality of characters in the edger code; identifying a weight for each value; and combining the weight for each value to generate the total weight.

19. The method of claim 18, further comprising: determining that one or more unweighted characters in the edger code are not assigned a weight; and ignoring the one or more unweighted characters when determining the total weight.

20. The method of claim 15, further comprising providing feedback to a source device that provided the edger code, wherein the feedback comprises information regarding an ability of the ophthalmic lens edging machine to execute the requested edging job associated with the edger code.

* * * * *